May 25, 1965

A. S. WILCZEK 3,185,884

MICROWAVE COUPLING APPARATUS FOR SLOW WAVE CIRCUITS AND TUBES USING SAME

Filed Aug. 1, 1962

INVENTOR.

ANDREW S. WILCZEK

BY Harry E. Aine

ATTORNEY

United States Patent Office 3,185,884
Patented May 25, 1965

3,185,884

MICROWAVE COUPLING APPARATUS FOR SLOW WAVE CIRCUITS AND TUBES USING SAME

Andrew S. Wilczek, Old Bridge, N.J., assignor to S-F-D Laboratories, Inc., Union, N.J., a corporation of New Jersey Filed Aug. 1, 1962, Ser. No. 214,114
8 Claims. (Cl. 315—3.5)

Figures 1, 2, 3, 4, 5, 6:
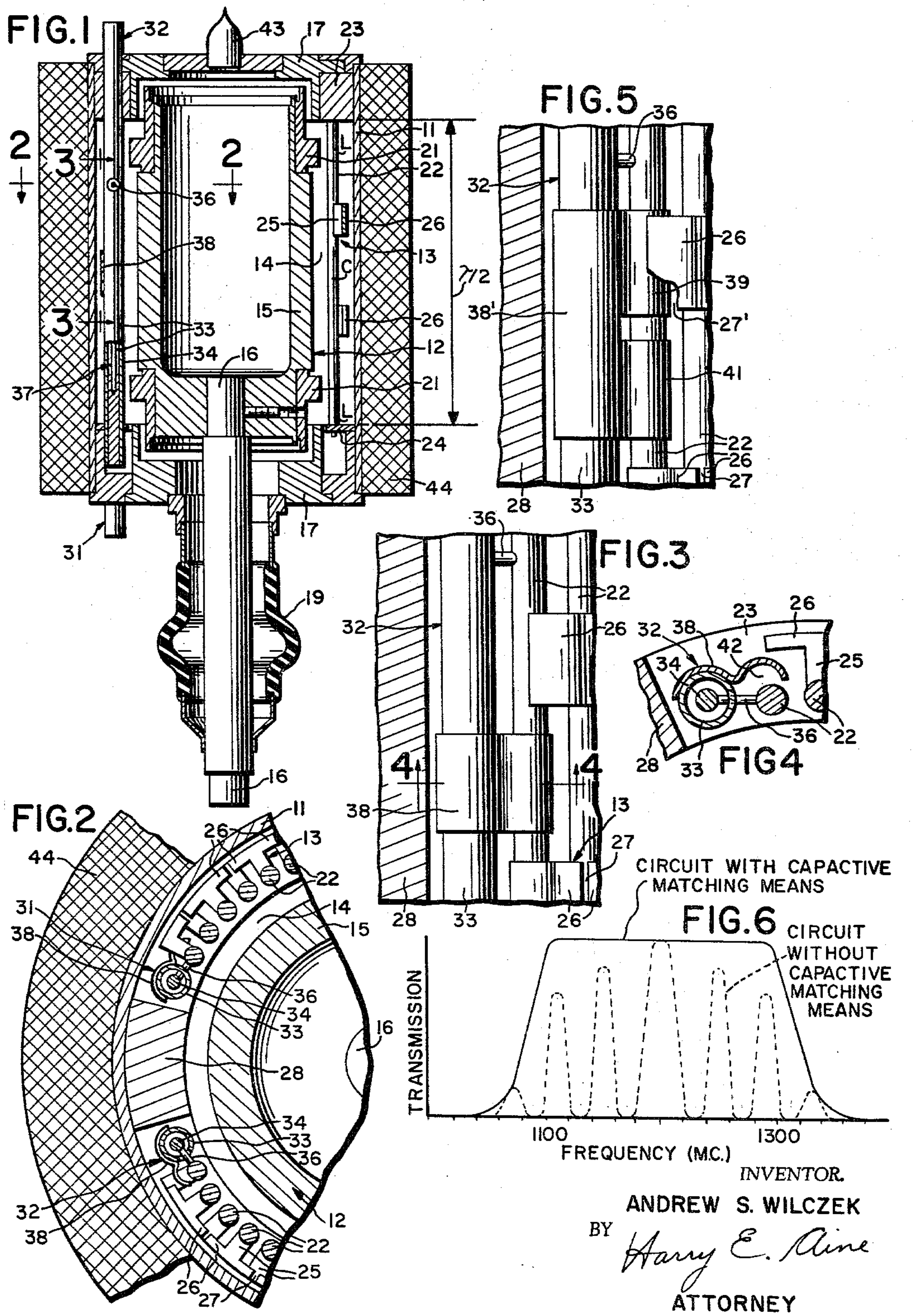

The present invention relates in general to microwave devices of the type wherein a traveling electromagnetic wave of phase velocity less than the velocity of light interacts with a stream of particles (for example, electrons) and more particularly to novel techniques for providing slow-wave circuits having increased interaction bandwidth and comprising an array of conducting resonant elements.

Crossed-field devices are presently being built utilizing slow-wave structures made up of an array of resonant elements wherein the resonant elements are conductors which extend for a distance $$(n+1)\frac{\lambda}{2}$$

($\lambda$=wavelength reference operating frequency, $n$=0, 1, 2, etc.) between two spaced apart short circuiting planes. Slow-wave circuits employing an array of such elements are characterized by a high interaction impedance and high power handling capabilities. The bandwidth of such circuits have been improved by providing a resonant element array slow-wave structure adapted to propagate a forward wave with a phase shift of between $\pi/2$ and $\pi$ radians per element. This has been accomplished by providing means for preferentially capacitively coupling alternate resonant elements in the capacitive regions thereof. Such a slow-wave circuit forms the subject matter of and is claimed in copending U.S. application 164,008, filed January 3, 1962, titled "Slow Wave Circuit," inventor Hunter L. McDowell, and assigned to the same assignee as the present invention. In a typical structure, conducting members are connected to each element of the resonant array in the central capacitive region thereof and extend in spaced apart capacitive relation with respect to members extending from the two alternate elements closest thereto. However, in slow-wave structures provided with alternate capacitively coupled resonant elements difficulty has arisen in matching to the circuit over a broadband frequency range. With the above-mentioned slow-wave structures connected to input and output coaxial lines only a 1 percent bandwidth had been obtainable.

According to the present invention means are provided for producing a preferentially capacitive coupling from each of the input and output coaxial lines to the closest element of an array of resonant elements whereby a broadband match is obtained.

The object of the present invention is to provide a broadband wave propagating structure comprised of an array of conducting elements.

One feature of the present invention is the provision of a wave propagating structure including an array of conducting elements, means for coupling energy to or from the array, and means for providing a reactance between said array and said means for coupling energy to or from the array whereby the wave propagating structure will propagate signals over a wide frequency range.

Another feature of the present invention is the provision of a wave propagating structure including an array of conducting elements, means for coupling energy to or from the array, and means preferentially capacitively coupling the coaxial line means to one element of the array whereby the wave propagating structure will propagate signals over a wide frequency range.

Another feature of the present invention is the provision of a novel wave propagating structure according to the last aforementioned feature wherein the array of conducting elements includes a plurality of conducting rods connected to and positioned between two spaced apart shorting members and the coaxial line means includes an outer conductor and a center conductor with the center conductor connected to one conducting rod of the array and the outer conductor preferentially capacitively coupled to that conducting rod of the array.

These and other features and advantages of the present invention will become more apparent upon a perusal of the following specification taken in connection with the accompanying drawing wherein:

FIG. 1 is a side cross sectional view of a crossed-field amplifier utilizing the features of the present invention, FIG. 2 is an enlarged cross sectional view of a portion of the structure of FIG. 1 taken along line 2—2 in the direction of the arrows, FIG. 3 is an enlarged side view of a portion of the structure of FIG. 1 taken along line 3—3 in the direction of the arrows, FIG. 4 is a cross sectional view of a portion of the structure shown in FIG. 3 taken along line 4—4 in the direction of the arrows, FIG. 5 is an enlarged side view of an alternative embodiment of the present invention, and FIG. 6 is a graph showing a plot of circuit transmission versus frequency for wave propagating structures provided with and without the capacitive matching apparatus according to the present invention.

Referring now to FIGS. 1 and 2 illustrating a crossed-field amplifier tube utilizing the present invention the tube comprises an evacuated envelope 11 provided with a cathode-electrode assembly 12 axially located therein and an anode-electrode assembly 13 surrounding and spaced from the cathode assembly 12 to define a wave-electron stream interaction region 14 therebetween.

The cathode electrode assembly 12 includes a continuous cylindrical cold cathode 15 made of a material having a high secondary emission ratio such as beryllium-copper, which is supported coaxially within the tube by means of a shaft 16 of, for example, copper extending through the lower of a pair of annular header members 17 which are made of a magnetic material as, for example, iron to serve as pole pieces. The shaft 16 serves as the cathode connection for the tube and is electrically insulated from the remainder of the tube by means of an annular insulator 19 of, for example, glass. The cathode is provided with a pair of end hats 21 of, for example, iron which confine the emitted electrons to the interaction region 14 between the cathode assembly 12 and the anode assembly 13.

The anode assembly 13 includes an array of half-wave resonant conducting rods or elements 22 of, for example, molybdenum which are distributed along spaced apart top and bottom shorting members 23 and 24, respectively, of, for example, copper forming a slow-wave structure with the elements being generally transversely directed in the direction of wave propagation. The axial standing wave pattern established on such resonant elements exhibits characteristic regions of high electric field intensity, referred to herein as capacitive regions, and characteristic regions of high magnetic field intensity, referred to herein as inductive regions. In the structure of FIGS. 1–4 a capacitive region C exists near the center of the conducting rods 22 and an inductive region L exists near the shorted ends of each rod (see FIG. 1).

In order to increase the interaction bandwidth of the slow-wave structure and insure forward wave interaction each conducting rod 22 is provided in the central capacitive region thereof with a conducting member 25 of, for example, copper with extending portions 26 of, for example, copper disposed in spaced apart relationship with respect to the extending portions 26 of conducting members 25 on the two alternate conducting rods 22 closest thereto to form capacitive coupling gaps 27 therebetween. One band of conducting members 25 couples one set of alternate conducting rods 22, and a second band couples the remaining rods 22.

The slow-wave structure is interrupted to provide a drift segment 28. On opposite sides of the drift segment 28 input and output coaxial lines 31 and 32, respectively, are mounted on shorting members 23 and 24 with the axes of coaxial lines 31 and 32 parallel to the axes of the conducting rods 22 of the anode assembly 13. The coaxial transmission lines 31 and 32 project out of opposite ends of the envelope 11 and have their axes parallel with the tube axis.

Each of the coaxial lines 31 and 32 has an outer conductor 33 of, for example, copper and a center conductor 34 of, for example, copper and is provided with a vacuum tight wave permeable window (not shown) of, for example, alumina ceramic sealed between the outer and center conductors 33 and 34, respectively. A conducting pin 36 of, for example, copper connects the next adjacent conducting rods 22 to the center conductors 34 of input and output coaxial lines 31 and 32 to couple the coaxial lines 31 and 32 to the remainder of the slow-wave circuit.

Each of the coaxial lines 31 and 32, at the inner end thereof is provided with a quarter-wave stub 37 for rigidly supporting the inner conductor. These coaxial line input and output circuits form the subject matter of and are claimed in U.S. application 214,115, filed August 1, 1962, titled "Crossed Field Tube Coupling Apparatus," inventor Andrew S. Wilczek et al., and assigned to the same assignee as the present invention.

A capacitive matching tab 38 of, for example, copper is secured as by brazing to each of the outer conductors 33 of the input and output coaxial lines 31 and 32, respectively, and extends toward the central capacitive region of the coupling rod 22 adjacent thereto between the rows of conducting members 25 to form a capacitive gap 42 therebetween. It has been discovered that by the use of the capacitive matching tab 38 providing a capacitive coupling between the outer conductors 33 and the conducting rods 22 adjacent thereto a broadband circuit is provided. It is believed that the capacitance introduced by the capacitive gap 42 tunes out a discontinuity reactance which appears at the junction of pin 36 and the first rod 22 due to the sudden discontinuity in the electric and magnetic field distributions at this junction. For example, referring now to FIG. 6, there is shown a plot of circuit transmission versus frequency for a wave propagating structure provided with the capacitive matching tab 38 and for a wave propagating structure which is not provided with the capacitive matching tab 38. As can be seen, a tube with about a 10 percent bandwidth is provided by means of the circuit with the capacitive matching tab 38 whereas only 1 percent bandwidth is obtainable without this capacitive matching tab 38.

Although the capacative matching tab 38 need not be between the bands of conducting members 25 which encircle the anode assembly 13, experience has shown that this is where it gives the best results.

Another way of tuning out the discontinuity reactance at the junction of the pin 36 and the rod 22 has been found. The length of the quarter-wave stub 37 can be changed slightly from a quarter wavelength to produce a capacitive effect which will partially tune out the discontinuity reactance. However, the tuning effect produced by varying the length of the quarter-wave stub 37 is not as great (and, therefore, not as effective) as the tuning effect of the capacitive tab described above. Both of these tuning means can be utilized simultaneously.

In an alternative embodiment shown in FIG. 5 the capacitive matching tab 38′ is provided with a main portion 41 extending toward the central capacitive region of the adjacent conducting rod 22 and is provided with a side portion 39 which extends toward the extending portion 26 of the conducting member 25 on the alternately next adjacent conducting rod 22 in the region of one band of conducting members 25 to provide the capacitive coupling gap 27′ between the alternate next adjacent coupling rod 22 and the outer conductor 33 of the coaxial lines 31 and 32. By means of this side portion 39 the outer conductors 33 of the input and output coaxial lines 31 and 32 serve as a portion of the slow-wave structure.

The tube is evacuated and sealed by means of a pinch-off tube 43.

A vertically directed magnetic field is provided in the interaction region 14 by means of a solenoid 44 axially aligned with and surrounding the tube. The crossed electric field in the region 14 is provided by means of a negative voltage applied between the grounded anode assembly and the cathode shaft 16.

In operation, a signal which it is desired to amplify is fed to the slow-wave circuit of the anode electrode assembly 13 via the input coaxial line 31. This signal establishes a traveling wave in the interaction region 14 of sufficient intensity to initial the emission of electrons from the cold cathode 15, and this emission can be sustained by secondary emission due to back bombarding electrons which have gained energy from the wave without the necessity of supplying external heating power.

The interacting electron stream moves through the region 14 with a clockwise circumferential velocity determined by the ratio of electric-to-magnetic field. The phase velocity of the traveling-wave is approximately synchronous with this electron stream velocity for a wide band of frequency so that the electrons deliver energy to and amplify waves within this band, the amplified output signal being taken out through the output coaxial line 32. The drift segment 28 is of sufficient length to permit electron debunching so that electrons may re-enter the interaction region for improved efficiency without producing undesired internal feed-back.

A circular crossed-field amplifier tube constructed according to the present invention for a frequency range of from 900 to 2,000 megacycles and which produces a peak output power on the order of 100 kilowatts with a gain of 20 db is less than 15 inches long and 4 inches in diameter.

While the invention has been described with respect to circular cross-field amplifiers it is adaptable for the output of a magnetron oscillator. Also it is useful in planar type tubes which utilize a circuit of the type described. For example, the invention can be used in so-called M-type tubes and O-type tubes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A wave propagating structure comprising
(*a*) an array of conducting elements distributed along a desired path of wave propagation,
(*b*) at least one of said elements extending along its axis away from said array,
(*c*) a hollow cylindrical conducting member surrounding said one element,
(*d*) means for connecting said one element to an adjacent element, said one element and said hollow conductor comprising a coaxial line for coupling wave energy to or from said slow-wave structure, and (*e*) means for preferentially capacitively coupling said conducting member to said adjacent element.

2. A microwave amplifier tube comprising, in combination, (*a*) first extended electrode means, (*b*) second extended electrode means spaced from said first electrode means and forming an interaction region therebetween, (*c*) an array of resonant conducting elements connected to said second electrode means and distributed along the length thereof, (*d*) coaxial line means for coupling energy to or from said array, (*e*) means for connecting said coaxial line means to one element of said array, (*f*) means for preferentially capacitively coupling said coaxial line means to said one element of said array, (*g*) means for generating a voltage between said first and second electrode means which establishes a unidirectional electric field in said interaction region, and (*h*) means for establishing a unidirectional magnetic field in cross relation with respect to said electric field whereby electrons in said interaction region deliver energy to a slow wave on said second electrode means for amplifying said slow wave.

3. A microwave amplifier tube comprising, in combination, (*a*) first extended electrode means, (*b*) second extended electrode means spaced from said first electrode means and forming an interaction region therebetween, (*c*) an array of resonant conducting rods connected to said second electrode means and distributed along the length thereof, (*d*) input coaxial line means for energizing said array with a microwave signal wave, (*e*) output coaxial line means for extracting an amplified signal wave therefrom, (*f*) means for connecting said input and output coaxial line means to the first and last conducting rods, respectively, of said array, (*g*) means for preferentially capacitively coupling said input and output coaxial line means to said first and last conducting rods, respectively of said array, (*h*) means for generating a voltage between said first and said second electrode means which establishes a unidirectional electric field in said interaction region, and (*i*) means for establishing a unidirectional magnetic field in crossed relation with respect to said electric field whereby electrons in said interaction region deliver energy to said microwave signal wave and amplify the same.

4. The microwave amplifier tube according to claim 3 wherein each of said input and output coaxial line means includes an outer conductor and a center conductor spaced therefrom, (*a*) said center conductors of said input and output means connected respectively to said first and said last conducting rods of said array, (*b*) said outer conductors of said input and output means preferentially capacitively coupled respectively to said first and said last conducting rods of said array.

5. A slow wave circuit comprising, an array of spaced apart generally parallel directed conductive elements distributed along and generally transversely directed to a predetermined path of wave propagation, means coupling together said array of conducting elements to form a wave propagating structure, means forming a two conductor transmission line coupled to said array, one conductor of said transmission line being coupled to one of said conducting elements of said array at a first location on said element, and means forming a capacitive coupling for coupling the other one of said conductors of said transmission line to said same element of said array at a spaced location on said same element from said first coupling location whereby said wave propagating structure will propagate signals over a wide frequency range.

6. A microwave tube apparatus including, means forming a cathode electrode structure for forming a stream of electrons, means forming an array of spaced apart generally parallel directed conducting elements distributed along the path formed by the stream of electrons with said conducting elements being generally transversely directed to the stream of electrons, means electrically coupling together said array of conducting elements to form a slow wave circuit for propagating wave energy in electromagnetic interaction with the stream of electrons for amplification of the wave energy traveling on said slow wave circuit, means forming a two conductor transmission line for coupling wave energy from said array of conducting elements, one of said conductors of said transmission line being coupled to one of said conducting elements at a first location on said element, and means forming a capacitive coupling for coupling the other of said conductors of said transmission line to said same element of said array at a spaced location on said same element from said first connection whereby said wave propagating structure will propagate signals over a wide frequency range.

7. The apparatus according to claim 6 wherein said cathode electrode includes a cylindrical structure having an arcuate electron emission portion for generating the stream of electrons, and wherein said array of conducting elements comprises an array of elongated conductive bars with said array being coaxially disposed of said cylindrical cathode electrode structure, and wherein said two conductor transmission means includes a conductive connection of one of said conductors to one of said bars, and said capacitive means couples the other conductor of said transmission means to said same bar at a position nearer to the center of said bar than said point of first connection.

8. The apparatus according to claim 7 wherein said two conductor transmission line is a coaxial line formed by a hollow bar parallel directed and disposed adjacent and axially co-extensive with said coupled bar of said array of bars, and said one conductor of said transmission line that is conductively coupled to said first bar of said array is the center conductor of said coaxial transmission line, said center conductor passing through an aperture in said hollow bar to said coupled bar of said array which is adjacent thereto, and said second conductor of said transmission line is formed by the outer conductor of said coaxial line, and said capacitive coupling means includes a conductive tab extending from said outer conductor of said hollow bar over to and adjacent the central region of said coupled bar of said array of bars.

References Cited by the Examiner

UNITED STATES PATENTS 2,939,992 6/60 Peifer ------------ 315—39.53 X

GEORGE N. WESTBY, *Primary Examiner.*